United States Patent Office 2,843,452
Patented July 15, 1958

2,843,452
PRECIPITATION OF PROTACTINIUM

Robert Lee Moore, Richland, Wash., assignor to the United States of America as represented by the United States Atomic Energy Commission No Drawing. Application November 2, 1956
Serial No. 620,159

7 Claims. (Cl. 23—14.5)

This invention deals with the recovery of protactinium values from aqueous solutions such as they are obtained for instance from ores ($Pa^{231}$) or from neutron-irradiated thorium ($Pa^{233}$). The process is also suitable for the separation of protactinium values from $U^{233}$ values, the decay product of $Pa^{233}$.

Protactinium has been recovered heretofore from aqueous solutions by precipitation. All the precipitating agents used or tried heretofore, however, show a number of disadvantages. For instance, manganese dioxide has given good recovery yields; however, the precipitate obtained with manganese dioxide is too voluminous and also difficult to separate, for instance by centrifuging, this especially when zirconium or phosphate ions are present. Manganese dioxide was also found to decompose and redissolve in a few days under the influence of radiation.

It is an object of this invention to provide a process for the recovery of protactinium values from aqueous solutions by carrier precipitation in which the above-described disadvantages are not encountered.

It is thus an object of this invention to provide a process of recovering protactinium values from aqueous solutions by carrier precipitation wherein the precipitate has a relatively small volume so that centrifuges or other separation equipment can handle a comparatively great quantity of material in a given period of time.

It is also an object of this invention to provide a process for the separation of protactinium values from aqueous solutions by carrier precipitation in which the carrier precipitate can be separated readily from the supernatant and the supernatant is obtained as a clear liquid, even in the presence of zirconium and/or phosphate ions.

It is finally also an object of this invention to provide a process by which protactinium values present in an aqueous solution in tracer concentration can be separated from other metal values present in macroconcentration.

It has been found that a lead dioxide or tin dioxide carrier precipitate, when formed in situ in the solution accomplishes a better protactinium recovery than has been obtained heretofore with other carrier precipitates, such as manganese dioxide, or with preformed lead or tin dioxide carriers. The invention based on these findings comprises incorporating a metal compound selected from the group consisting of lead (II) compound and tin (II) compound to an aqueous mineral acid-containing solution of protactinium values, securing the presence of an oxidizing agent in said solution whereby said metal compound is precipitated in the form of the dioxide and the protactinium values are carried on said dioxide, and separating said dioxide from the aqueous solution.

As mentioned above, the aqueous solution advantageously contains free mineral acid; nitric acid is the preferred mineral acid.

In the case of using lead dioxide as the carrier, the lead cations are preferably added to the protactinium-containing solution in the form of a water-soluble lead salt, preferably as lead nitrate, $Pb(NO_3)_2$. For forming the precipitate, any oxidizing agent is suitable as long as its potential is sufficiently negative to oxidize the Pb(II) to Pb(IV). For instance, ammonium persulfate together with a silver ion catalyst has been found suitable. The preferred oxidizing agent, though, is sodium bismuthate.

For a tin dioxide carrier the tin is preferably added to the aqueous solution in the form of stannous oxide, SnO; if the mineral acid in the protactinium-containing solution is nitric acid, the addition of a separate oxidizing agent is not necessary; the nitric acid is a strong enough oxidizing agent and precipitates stannic oxide, $SnO_2$.

For both carriers it is advantageous to let the solution plus precipitate digest, preferably at elevated temperature for approximately from one to two hours, prior to separation of the precipitate from the supernatant. A temperature of about 100° C. gave the best results. It was found that the volume of the lead dioxide precipitate was about ⅛ of the corresponding volume of a manganese dioxide precipitate and also that the tin dioxide volume was considerably smaller than the manganese dioxide volume as will be shown later.

In the following a number of examples are given for illustrative purposes only without the intention to have the invention limited to the details given therein.

Example 1 shows the superiority of the use of a co-formed (precipitated in situ) lead dioxide carrier over that of the preformed compound.

EXAMPLE 1

To an aqueous solution 1 M in thorium values, 1 M in nitric acid and containing protactinium$^{233}$ in tracer concentrations, lead nitrate was added in a quantity of 10 g./l. of solution; thereafter 25 g./l. of sodium bismuthate was added. The solution was warmed to about 95° C. on a water bath and held at that temperature for one hour. The lead dioxide which had precipitated was separated from the supernantant by centrifuging, and the supernatant was analyzed for protactinium. The analysis showed that 98.5% of the protactinium originally present in the solution had been removed by the lead dioxide carrier; this amounted to a decontamination factor of 66.7.

The experiment was repeated under identical conditions with the exception that preformed lead dioxide was added to two portions of an identical protactinium-containing solution; in one instance 10 g. of lead dioxide were added per liter of solution and in the other instance 50 g./l. The respective decontamination factors obtained were 1.9 and 2.9. This clearly shows the radical superiority of carrier precipitation in situ.

The next example shows the effect of thorium concentration and nitric acid concentration on the protactinium recovery by the process of this invention.

EXAMPLE 2

Aqueous solutions were used containing thorium and nitric acid in varying concentrations, protactinium$^{233}$ in tracer concentration, hydrofluoric acid in a concentration of 0.015 M and lead nitrate, $Pb(NO_3)_2$, in a concentration of 0.05 M; sodium bismuthate was added to each solution in a quantity of 25 g./l. of solution. The mixtures were heated at 100° C. for one hour. The precipitates were separated from the supernatants and the latter were analyzed. The decontamination factors obtained at the various thorium and nitric acid concentrations are compiled in Table I.

Table I

| Th, M | HNO₃, M | Pa, DF* |
|---|---|---|
| 0 | 1 | 612 |
| 0.2 | 1 | 855 |
| 0.5 | 1 | 483 |
| 1 | 1 | 106 |
| 1.25 | 1 | 73 |
| 1.75 | 1 | 19 |
| 1 | 2.5 | 10 |
| 1 | 5 | 2.6 |

*DF = decontamination factor for protactinium.

It is obvious from the table that scavenging is less satisfactory at higher thorium and higher acid concentrations than at the lower concentrations. At a concentration of 1 M each of thorium and nitric acid, which are the average concentrations of feed solutions for solvent extraction, the decontamination factor after one single step was over 100. Of course, a repetition of the process with the supernatant will accomplish a higher degree of decontamination.

The following example shows the effect of the lead concentration on the degree of protactinium recovery.

EXAMPLE 3

A number of precipitations were carried out from various portions of a solution 1 M in thorium, 1 M in nitric acid, 0.015 M in hydrofluoric acid and containing protactinium$^{233}$ in tracer concentration. Lead nitrate in the concentrations given below was added to the portions of the solution. Table II shows the decontamination factors obtained at the lead nitrate concentrations used.

Table II

| Pb(NO₃)₂, M | Pa, DF* |
|---|---|
| 0.005 | 2.1 |
| 0.01 | 8 |
| 0.02 | 15 |
| 0.03 | 68 |
| 0.05 | 93 |
| 0.10 | 128 |

*DF = decontamination factor for protactinium.

This table demonstrates that the lead nitrate should be present in solutions of customary concentrations in a concentration of at least 0.03 M in order to accomplish satisfactory protactinium precipitation.

The next example contains a set of comparative experiments using (a) preformed stannic oxide and (b) coformed stannic oxide.

EXAMPLE 4

(a) To a solution containing thorium values in a concentration of 1 M, being 1 M in nitric acid, 0.015 M in hydrofluoric acid and containing protactinium values in tracer concentration, a preformed tin dioxide precipitate was added in the concentrations indicated in Table III. The mixture obtained in each instance was digested for two hours at 100° C., and the precipitate was then removed by centrifuging. As before, the supernatant was analyzed for its protactinium content, and the decontamination factor was calculated from the analytical values. The results of these tests are given in Table III.

Table III

| SnO₂, M | CSV*, Percent of Solution | Pa, DF** |
|---|---|---|
| 0.05 | 0.5 | 5.4 |
| 0.10 | 0.7 | 9.7 |
| 0.20 | 1.2 | 27 |

*CSV = centrifuged slurry volume.
**DF = decontamination factor.

The centrifuged slurry volume is indicated in Table III in percent of the solution to which the precipitate was added; these values compare very favorably with the volume in the case of manganese dioxide; where for instance, in the case of 0.05 M MnO₂ and SnO₂, respectively, the centrifuged slurry volumes were 8% and 0.5%.

(b) In another set of experiments, stannous oxide was added to the same solution as in (a) above instead of preformed tin dioxide. Digestion and centrifuging also were the same as above. The results of these experiments are compiled in Table IV.

Table IV

| Initial SnO, M | CSV,* percent | Pa, DF** |
|---|---|---|
| 0.05 | 0.7 | 42 |
| 0.10 | 1.0 | 100 |
| 0.20 | 2.0 | 104 |
| 0.5 | ------- | 620 |

*CSV = centrifuged slurry volume.
**DF = decontamination factor.

A comparison of Tables III and IV clearly shows the superiority of a tin dioxide carrier that has been formed in the solution over the preformed carrier.

The carrier precipitates can be dissolved for the isolation of the protactinium values. An aqueous solution of a reducing agent, such as sodium nitrite or an acid solution of hydrogen peroxide, for instance, has been found suitable for dissolving the lead oxide carrier precipitate. Other reducing agents, including hydroxylamine, are also suitable. The stannic oxide precipitate can be dissolved in a caustic solution, or the protactinium can be leached off the precipitate with concentrated nitric acid. The carrier compounds can then be separated from the protactinium by any method known to those skilled in the art. For instance, the lead can be deposited electrolytically, or it can be precipitated selectively from the solution at a high acid concentration at which protactinium is not appreciably carried. The lead can also be precipitated together with the bismuth as the sulfides. Another possibility is selective solvent extraction of the protactinium. The recovery of the protactinium from the carrier precipitate, however, is not part of this invention.

The process of this invention is applicable, for instance, to the recovery of protactinium values from thorium-containing solutions prior to thorium extraction with trialkylphosphate or other solvents; by removing the protactinium, decomposition of the solvent under the effect of radiation is prevented and aging of the solutions for decay prior to extraction is made unnecessary. The process is also valuable for obtaining pure U$^{233}$, which is formed from protactinium$^{233}$ by $\beta$-decay, and there are a great many other applications for the process of this invention.

Zirconium and niobium values, which usually are hard to separate from uranium or thorium during solvent extraction because they are coextracted to a high degree, can also be removed from solutions prior to extraction by the process of this invention.

It will be understood that this invention is not to be limited to the details given herein but that it may be modified within the scope of the appended claims.

What is claimed is:

1. A process of recovering protactinium values from an aqueous nitric acid solution, comprising incorporating a water-soluble salt of a metal selected from the group consisting of divalent tin and divalent lead to said solution, oxidizing the salt whereby the dioxide of said metal is obtained in the form of a precipitate and said protactinium values are carried on said precipitate, and separating said precipitate from said solution.

2. The process of claim 1 wherein oxidation is carried out by adding sodium bismuthate.

3. The process of claim 1 wherein said metal salt is lead nitrate.

4. The process of claim 3 wherein oxidizing is carried out by adding sodium bismuthate.

5. The process of claim 1 wherein the metal salt is stannous nitrate and oxidation is effected by the nitric acid.

6. The process of claim 5 wherein the stannous nitrate is formed in situ by adding stannous oxide to the nitric acid solution.

7. The process of claim 1 wherein the precipitate is digested at about 100° C. for from one to two hours prior to separation of the precipitate.

No references cited.